(12) United States Patent
Huang

(10) Patent No.: US 10,598,841 B1
(45) Date of Patent: Mar. 24, 2020

(54) LIGHT GUIDE DEVICE

(71) Applicant: G.SKILL International Enterprise Co., Ltd., Taipei (TW)

(72) Inventor: Chiung-Huang Huang, Taipei (TW)

(73) Assignee: G. Skill International Enterprise Co., Ltd., Taipei (TW)

( * ) Notice: Subject to any disclaimer, the term of this patent is extended or adjusted under 35 U.S.C. 154(b) by 0 days.

(21) Appl. No.: 16/196,553

(22) Filed: Nov. 20, 2018

(51) Int. Cl.
*F21V 8/00* (2006.01)
*F21V 33/00* (2006.01)

(52) U.S. Cl.
CPC .............. *G02B 6/001* (2013.01); *F21V 33/00* (2013.01); *G02B 6/0006* (2013.01)

(58) Field of Classification Search
CPC ........ G02B 6/001; G02B 6/0006; F21V 33/00
See application file for complete search history.

(56) References Cited

U.S. PATENT DOCUMENTS

| | | | | | |
|---|---|---|---|---|---|
| 8,909,009 | B2 * | 12/2014 | Lee | ..................... | G02B 6/0036 385/129 |
| 2004/0109105 | A1 * | 6/2004 | Nagakubo | ............ | G02B 6/0055 349/65 |
| 2007/0115407 | A1 * | 5/2007 | Richard | ............ | G02F 1/133536 349/112 |
| 2010/0027242 | A1 * | 2/2010 | Kishine | ................. | G02B 5/045 362/97.1 |
| 2014/0104815 | A1 * | 4/2014 | Arai | ....................... | G02B 5/021 362/97.1 |
| 2014/0211483 | A1 * | 7/2014 | Cho | ..................... | G02B 5/0221 362/311.01 |
| 2015/0015924 | A1 * | 1/2015 | Fujiuchi | ............. | H04N 1/02835 358/474 |
| 2016/0202537 | A1 * | 7/2016 | Cho | ................. | G02F 1/133308 361/810 |

* cited by examiner

*Primary Examiner* — Anh T Mai
*Assistant Examiner* — Glenn D Zimmerman
(74) *Attorney, Agent, or Firm* — Muncy, Geissler, Olds & Lowe, P.C.

(57) ABSTRACT

A light guide device made of a light diffusing agent-free light transmissive material is disclosed to include a base provided with a light-incident surface at one side thereof to face toward the light-emitting side of a plurality of predetermined light-emitting devices, and a plurality of continuously connected and irregularly configured light guide components located on at least one side of the base and capable of unevenly projecting light passing therethrough toward the outside and respectively provided with at least three light-emitting surfaces, each light-emitting surface defining with the base a respective contained angle that causes a glare effect when light passes through the respective the light guide component.

10 Claims, 8 Drawing Sheets

LIGHT GUIDE DEVICE

BACKGROUND OF THE INVENTION

1. Field of the Invention

The present invention relates to light guide technology and more particularly, to a light guide device for use in computers and computer peripheral devices, which uses a plurality of continuously connected and irregularly configured light guide components to improve brightness uniformity by guiding light to the overall area of the light guide device and, which eliminates the use of any light diffusing agent so that the light projecting distance and range are increased, producing aurora-like glare effects and achieving a wide range of light emission.

2. Description of the Related Art

With the improvement in computer performance and efficiency, memories, processors and other computer peripheral devices (such as keyboards, etc.) for use in computer systems have also flourished. At present, the memory device used in e-sports products has the requirement of sound and light effects. Therefore, light-emitting devices (such as light-emitting diodes) are usually installed on the memory, and a light guide is arranged on the outside of the light-emitting devices. The light-emitting devices emit light toward the outside. The light emitted by the light-emitting devices is scattered evenly through the light guide to achieve good illumination and visual effects.

However, if the light guide is directly made of a material having high transparency and when the light-emitting devices emit light to the light guide, the light emitted by the light-emitting devices will directly pass through the light guide. When the user watches the light guide, the light guide may have a brighter brightness on the portion that faces the light-emitting devices, resulting in generation of uneven brightness and glare. In order to prevent generation of uneven brightness and glare, light guide manufacturers may add a fine particle-shaped light diffusing agent to the material for manufacturing the light guide, so that when the light passes through the light guide, the light diffusing agent can be used to refract and diffuse the light, thereby making the overall light output uniform. However, since the light is refracted by the light diffusing agent multiple times, the light is softened, and the phenomenon of fogging occurs, shortening the light projection distance and range and making the lighting effect less beautiful. Moreover, most of the light guides are designed to be flat strips. After the light passes through the light guides, it will only be uniformly scattered outwardly. A light guide through such a design makes the optical visual effect too tedious and cannot have gorgeous light refraction effect. It is difficult to attract consumers' attention.

Therefore, how to solve the above-mentioned problems and inconvenience is the direction that the relevant industry is eager to study and improve.

SUMMARY OF THE INVENTION

The present invention has been accomplished under the circumstances in view. It is a first object of the present invention to provide a light guide device, which is made of a light diffusing agent-free light transmissive material and adapted for use in computers and computer peripheral devices to improve brightness uniformity, comprising a base provided with a light-incident surface at one side thereof to face toward the light-emitting side of a plurality of predetermined light-emitting devices and a plurality of continuously connected and irregularly configured light guide components located on at least one side of the base and capable of unevenly projecting light passing therethrough toward the outside and respectively provided with at least three light-emitting surfaces. Each light-emitting surface defines with the base a respective contained angle that causes a glare effect when light passes through the respective light guide component. The arrangement of the continuously connected and irregularly configured light guide components on the base of the light guide device is capable of unevenly projecting light passing therethrough toward the outside, therefore, the light guide components guides the light to the entire light guide device to improve the uniformity of the overall brightness of the light guide device, thereby allowing the light guide device to emit a transparent and bright aesthetic sense. Uniform brightness can be used to prevent the viewer from seeing the light-emitting devices directly, avoiding glaring and uncomfortable eyes. Because the light guide device is not added with a light diffusion agent and can work with the light guide components to unevenly output the light emitted by the light-emitting devices, it effectively increases the light projection distance and range to produce a glare-like effect that is as beautiful as the aurora. In this way, the light-emitting effect can be more dazzling, so as to enhance the aesthetics of the projected light, thereby increasing the desire of the consumer to purchase.

It is a second object of the present invention to provide a light guide device, which does not need to add a light diffusing agent, so that the manufacturing cost can be reduced, and the phenomenon of uneven brightness and fogging can be avoided, thereby improving brightness uniformity and increasing the light projection distance and range.

It is a third object of the present invention to provide a light guide device, which is so designed that after installation of the light guide device in the memory, the light-emitting devices are located directly below the light-emitting surfaces of the light guide components and are not located at the intersection of the light-emitting surfaces. When the light-emitting devices emit light upward, the light-emitting surfaces produce good refracting effects without refracting light onto the intersections of the light-emitting surfaces, eliminating the problem of being too bright or too dark and further improving the overall brightness intensity of the light guide device and the brightness uniformity.

It is a fourth object of the present invention to provide a light guide device, wherein the light guide components that are arranged on the light guide device to face the light-emitting devices include two outer light guide components and a plurality of inner light guide components of two different heights alternatively arranged between the two outer light guide components, and the two outer light guide components are higher than the relatively shorter inner light guide components. This arrangement achieves better continuity of the light source, thereby improving brightness uniformity. Since the two outer light guide components is relatively higher than inner light guide components, the light projecting distance is effectively increased.

It is a fifth object of the present invention to provide a light guide device, which is so designed that when the light-emitting devices emit light onto the planar light-incident surface of the base, the flat design of the planar light-incident surface minimizes light reflection and effectively refracts incident light onto the light guide components, thereby increasing the light output an light projection range of light guide device to create a glare effect.

It is a sixth object of the present invention to provide a light guide device, wherein the light-incident surface of the base is planar. When removing the light guide device from the mold, the planar light-incident surface is flat, so that the mold release point is not generated, thereby reducing the difficulty of manufacturing the light guide device. This allows the light guide device to be mass produced through the mold.

It is a seventh object of the present invention to provide a light guide device, which is preferably made of polycarbonate, acrylonitrile butadiene styrene copolymer or a combination of the two. It can make the surface of the light guide device less prone to fogging and blurring when it is used for a long time, so as to maintain a good light extraction rate and prolong the service life of the light guide device.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
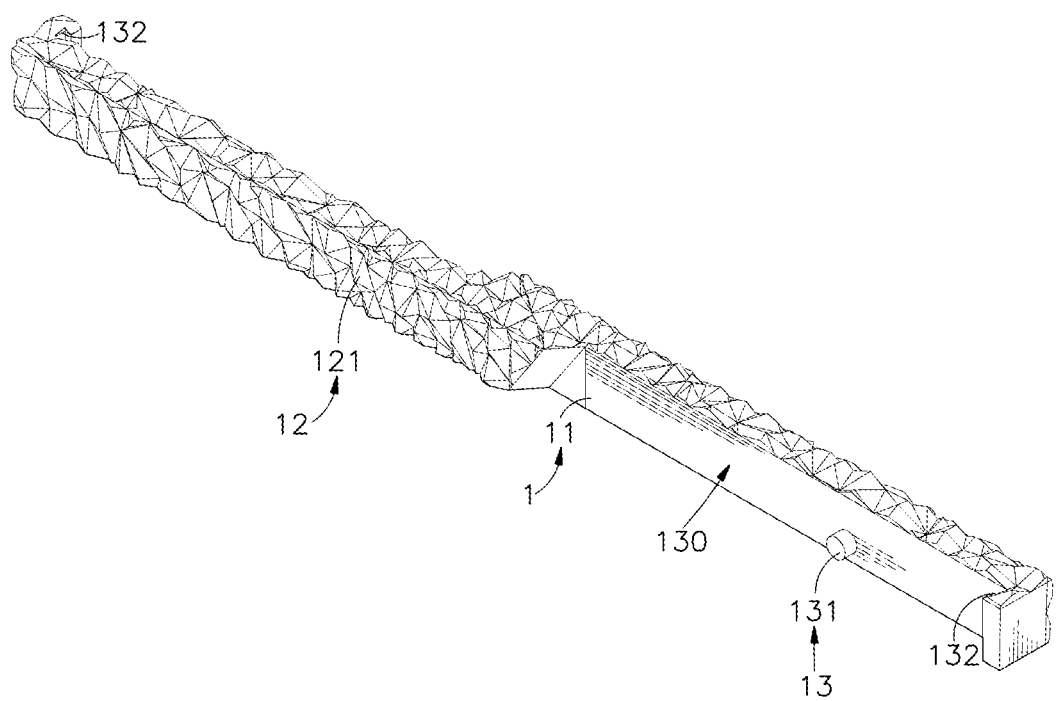
FIG. 1 is an oblique top elevational view of a light guide device in accordance with the present invention.
Figure 2:
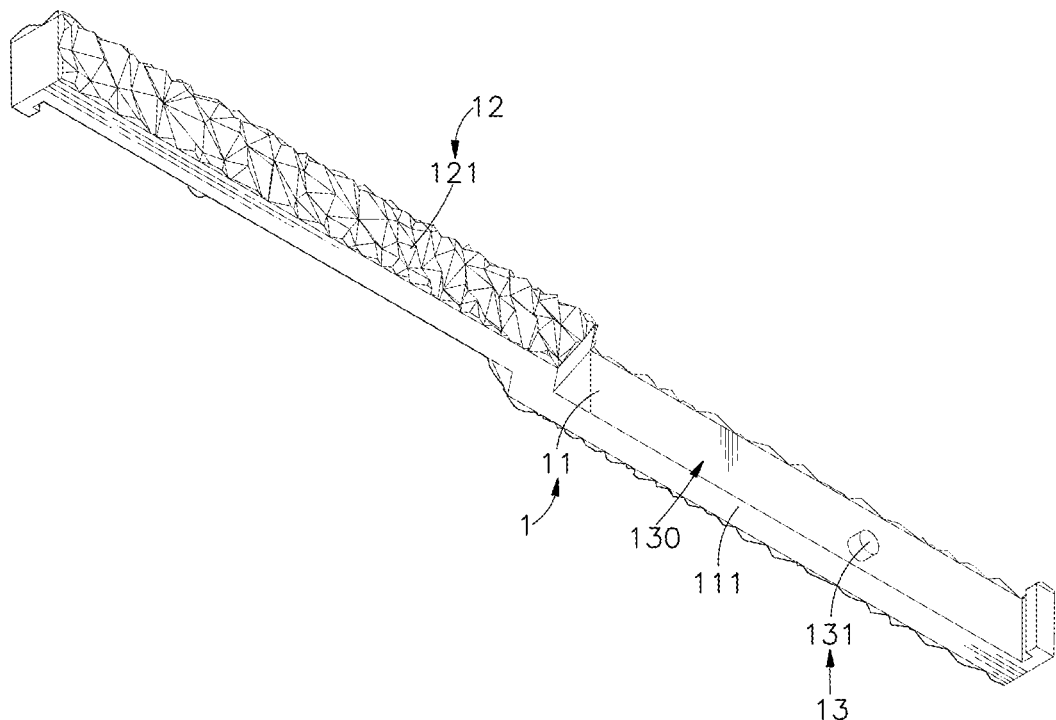
FIG. 2 corresponds to FIG. 1 when viewed from another angle.
Figure 3:
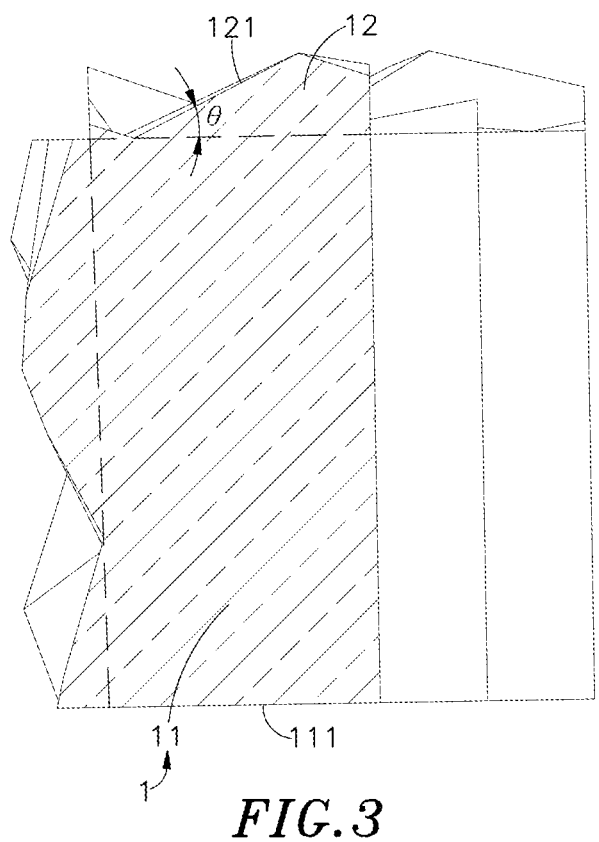
FIG. 3 is sectional side view, in an enlarged scale, of a part of the light guide device in accordance with the present invention.
Figure 4:
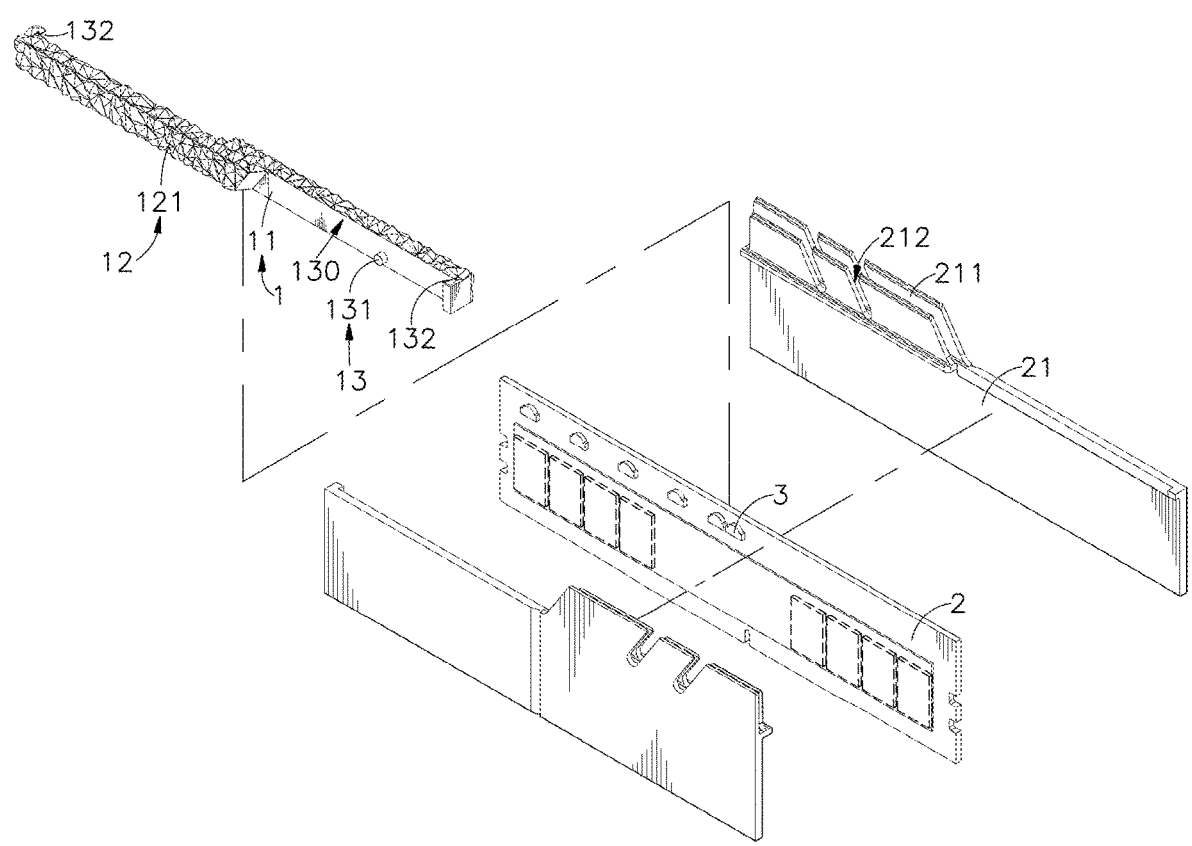
FIG. 4 is an exploded view of the present invention before installation of the light guide device in the memory.
Figure 5:
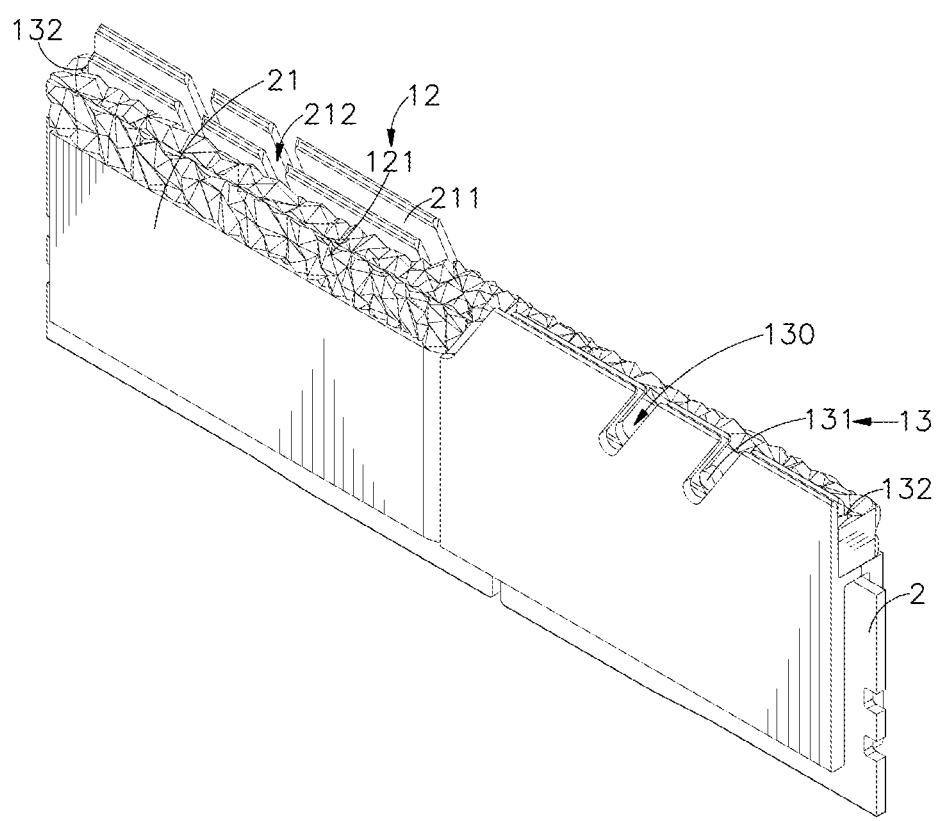
FIG. 5 is an elevational view illustrating the light guide device of the present invention installed in the memory.
Figure 6:
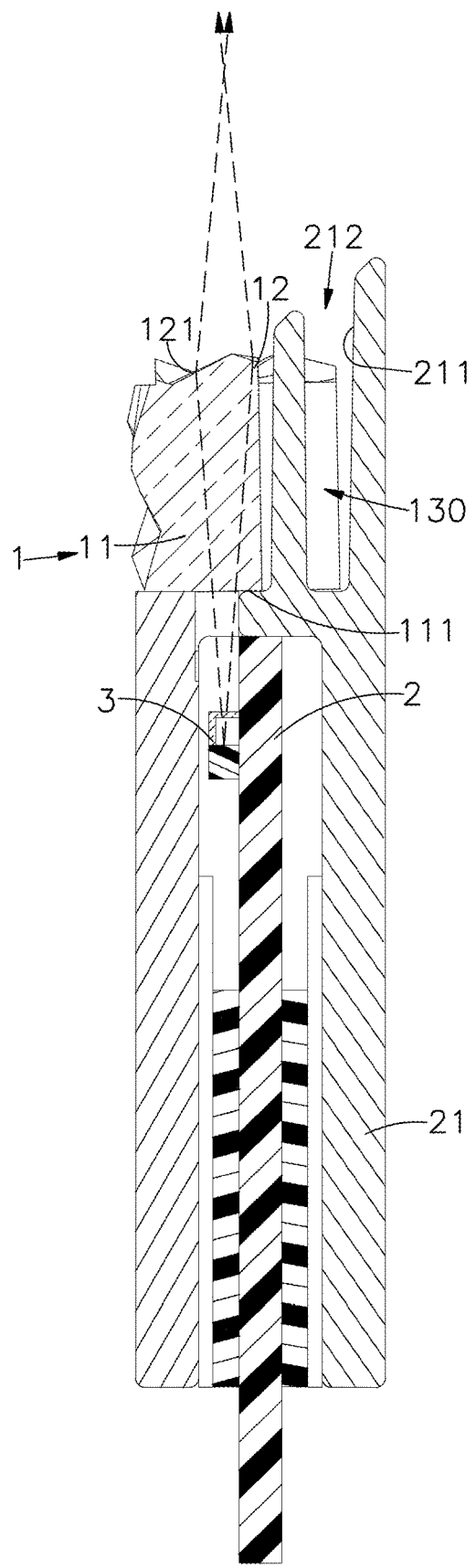
FIG. 6 is a schematic drawing illustrating the light emitted by the light-emitting devices passed through the light guide device.

Referring to FIGS. 1-3, an elevational view of a light guide device in accordance with the present invention, another elevational view of the light guide device and a sectional side view of the light guide device are shown. A light guide device 1 of the present invention is made of a light transmissive material without a light diffusing agent, comprising a S-shaped base 11 having a planar light-incident surface 111 located on at least one side thereof, a plurality of continuously connected and irregularly configured light guide components 12 located on at least one side of the base 11 and capable of unevenly projecting light passing therethrough toward the outside and respectively provided with at least three light-emitting surfaces 121 that respectively define with the base 11 a respective contained angle θ that causes a glare effect when light passes through the respective light guide component 12, and a mounting structure 13 located on the base 11. The mounting structure 13 comprises a plurality of recessed receiving grooves 130 respectively located on left and right sides of the base 11 and facing in opposite directions, a cylindrical positioning column 131 protruded from an inner wall of each recessed receiving groove 130, and two ⊏-shaped hooks 132 respectively located at two opposite ends of the base 11.

The light guide device 1 is made of a light-transmissive material without a light diffusion agent. The light-transmissive material can be selected from the group of polycarbonate (PC), acrylonitrile butadiene styrene (ABS) resin, acrylic, and glass. Preferably, the light guide device 1 may preferably be polycarbonate, acrylonitrile butadiene styrene copolymer or a combination of the two. Polycarbonate or acrylonitrile butadiene styrene copolymer has the characteristics of high surface smoothness, high transparency and high heat resistance. Based on characteristics of high surface smoothness, high transparency and high heat resistance, the surface of the light guide device 1 is not prone to matte when used for a long time, prolonging the service life. Further, before the light guide device 1 is released from a mold (such as a steel mold), the mold can be polished with a diamond paste to make the inner surface of the mold smooth and bright. When the plastic material (such as polycarbonate, acrylonitrile butadiene styrene copolymer or a combination thereof) is injection-molded and released from the mold, optical facets that are smooth and have better refraction effect are formed on the outer surface of the light guide device 1 thus produced. Since the planar light-incident surface 111 of the base 11 is flat, when releasing the light guide device 1 from the mold, no uneven release point will be generated, and therefore the light guide device 1 can be smoothly and quickly released from the mold, lowering the difficulty of manufacturing of the light guide device 1 and having the advantage of mass production.

Further, at least two light guide components 12 are formed on the base 11 of the light guide device 1 in a square area of 1 square centimeter. The light guide components 12 of the light guide device 1 can be triangular, tetragonal, pentagonal, hexagonal, heptagonal, octagonal or other irregular shape.

Further, the contained angle θ defined between the base 11 of the light guide device 1 and each light-emitting surface 121 of the light guide component 12 is within the range of 10°~85°, or preferably 25°~65°.

The angles θ defined between the plurality of light-emitting surfaces 121 in each light guide component 12 and the base 11 can be different from each other by different combinations of cutting angles, so that the outer surface of each light guide component 12 can be formed with different depths and each light guide component 12 with the respective multiple light-emitting surfaces 121 can be shaped like a diamond to have better uneven light-emitting effect.

Figure 7:
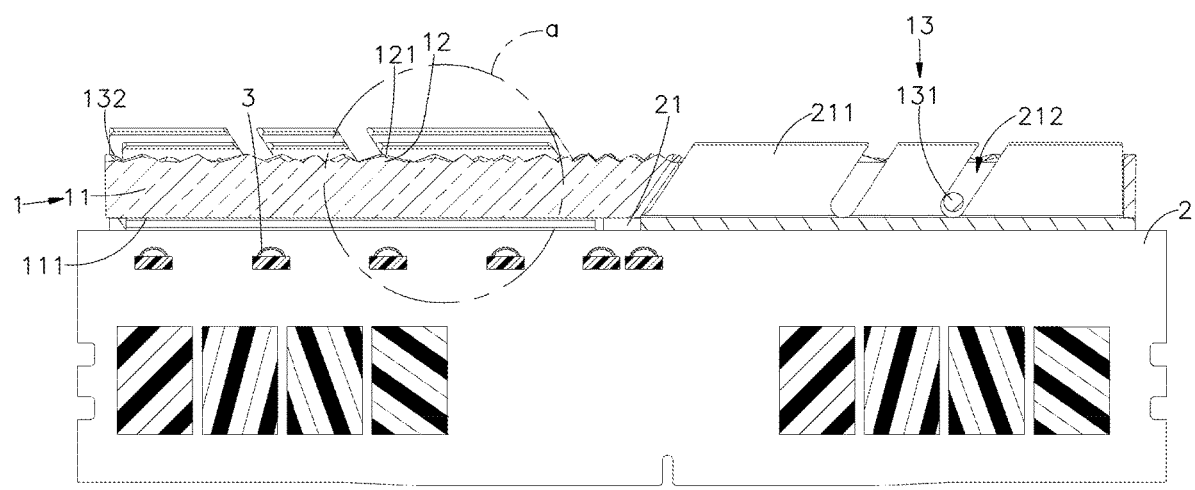
FIG. 7 is a sectional side view, illustrating the light guide device of the present invention installed in the memory.

Referring to FIGS. 4-8, an exploded view before installation of the light guide device in a memory, an elevational view after installation of the light guide device in the memory, a schematic drawing during light emitting of the light-emitting device, a sectional side view after installation of the light guide device in the memory and an enlarged view of part "a" of FIG. 7 are shown. It can be clearly seen from the drawings that in the actual use, the light guide device 1 is mounted on a heat dissipating device 21 of a memory 2. The heat dissipating device 21 comprises a plurality of radiation fins 211 located at the top thereof. Each radiation fin 211 has a plurality of positioning slots 212 obliquely downwardly extended from the topmost edge thereof. When mounting the light guide device 1 on the heat dissipating device 21, the radiation fins 211 of the heat dissipating device 21 are respectively received in the recessed receiving grooves 130 of the mounting structure 13, and at the same time, the cylindrical positioning columns 131 of the mounting structure 13 are respectively engaged in respective positioning slots 212 of the heat dissipating device 21, and the two hooks 132 of the mounting structure 13 are respectively hooked on two opposite sides of the heat dissipating device 21. Thus, the light guide device 1 is steadily secured to the heat dissipating device 21 of the memory 2. After the light guide device 1 is secured to the heat dissipating device 21 of the memory 2, the planar light-incident surface 111 of the base 11 is disposed to face toward the light-emitting side of multiple light-emitting devices 3 at the memory 2.

When the light-emitting devices 3 are activated to emit light, the emitted light falls upon the planar light-incident surface 111 of the base 11, and the incident light is refracted in the base 11 onto the light guide components 12 where the light guide components 12 emit the light through the light-emitting surfaces 121 toward the outside. The arrangement of the light-emitting surfaces 121 enables light rays to be concentrated on the area around the intersections of the light-emitting surfaces 121 (see FIG. 6), thus, the distance from which the light is projected can be increased. Further, because the light guide components 12 on the base 11 are continuously connected and irregularly configured, the light guide components 12 can be used to make the light unevenly emitted and diverted. Thereby, the uniformity of the overall brightness of the light guide device 1 is improved, causing generation of a glare effect and an increase in the light projection range and distance. Thus, the design of the light guide components 12 makes the light guide device 1 more dazzling.

Figure 8:
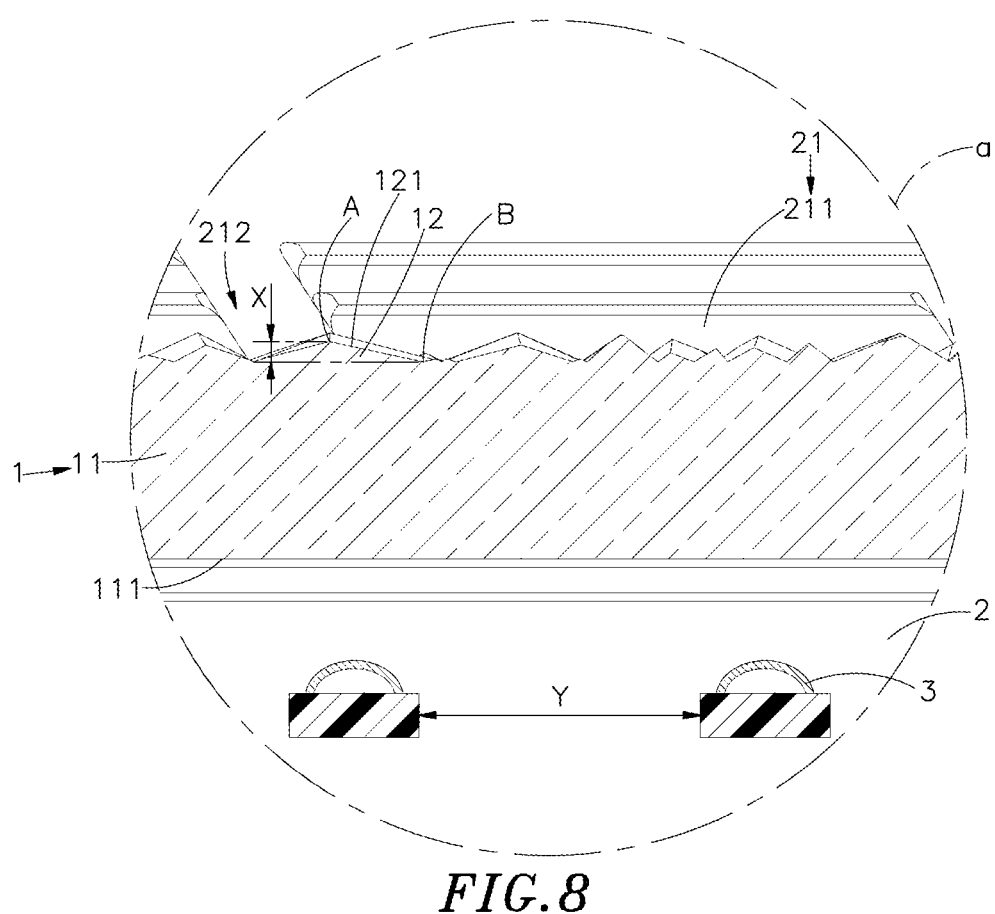
FIG. 8 is an enlarged view of part "a" of FIG. 7.

After installation of the light guide device 1 in the memory 2, the direct light emitting direction of the light-emitting devices 3 is opposite to the light-emitting surfaces 121 of the light guide components 12 (in FIG. 8, the light-emitting devices 3 are disposed right below the light-emitting surfaces 121) but not opposite to the intersection of the light-emitting surfaces 121 (see point A or point B in FIG. 8). When the light-emitting devices 3 are activated to emit light upward, if the light is projected toward the intersection of the light-emitting surfaces 121, the poor refractive effect at the intersection will make the brightness to be too bright or too dark (e.g. the light will be too bright if the light is emitted from point A, or the light will be too dark if the light emitted from point B), resulting in poor overall brightness uniformity. Therefore, the light-emitting devices 3 are preferably located directly below the light-emitting surfaces 121 of the light guide components 12 so that the light is projected toward the light-emitting surfaces 121 to achieve a good refractive effect, thereby improving the overall brightness intensity and uniformity of the light guide device 1.

Referring to FIG. 8, the height X of the light guide components 12 is preferably within the range of 0.8 mm~1.2 mm; the pitch Y of the light-emitting devices 3 is 15 mm. Through the above-mentioned size design, the light guide device 1 can produce good light guiding effect in a limited space of the computer and the computer peripheral device. As described above, the planar light-incident surface 111 of the base 11 faces toward the light-emitting devices 3 and the direct light emitting direction of the light-emitting devices 3 is opposite to the light guide components 12. Further, the light guide components 12 include two outer light guide components 12 and a plurality of inner light guide components 12 of two different heights alternatively arranged between the two outer light guide components 12, wherein the two outer light guide components 12 are higher than the relatively shorter inner light guide components 12. This arrangement achieves better continuity of the light source, thereby improving brightness uniformity. Since the two outer light guide components 12 is relatively higher than inner light guide components 12, the light projecting distance is effectively increased. In one example of the present invention, the pitch of the light-emitting devices 3 is 15 mm, the height of the two outer light guide components 12 is 1 mm, and the inner light guide components 12 are of two different heights, i.e., 0.8 mm and 1 mm and are alternatively arranged between the two outer light guide components 12. Thus, the light guide device 1 can extend the light source to the next inner light guide component 12 with a height of 1 mm through the adjacent inner light guide component 12 having a height of 0.8 mm, thereby effectively continuing the light source and improving the uniformity of brightness of the light guide device 1 to achieve a good lighting effect.

In the present preferred embodiment, the light guide device 1 is disposed adjacent to the light-emitting devices 3, however, in actual application, the light guide device 1 can be directly attached onto the surfaces of the light-emitting devices 3. Further, the light-emitting devices 3 are preferably light-emitting diodes (LEDs), however, in actual application, organic light-emitting diodes (OLEDs), incandescent lamps or halogen lamps can be used to replace light-emitting diodes (LEDs). Since the light guide device 1 uses the continuously connected and irregularly configured light guide components 12 to improve the overall brightness uniformity, no light diffusing agent shall be added, and thus, the manufacturing cost of the light guide device 1 can be reduced. Further, the light emitted by the light-emitting devices 3 is refracted by the light guide components 12, which not only does not cause unevenness of light and dark, but also does not contain a light diffusing agent, so that fogging does not occur, achieving better brightness uniformity, longer projection distance and wider projection range.

Preferably, the light guide device 1 is disposed on the heat dissipating device 21 of the memory 2. In actual application, the light guide device 1 can be installed in a cooling fan or CPU inside a computer that is provided with the light-emitting devices 3, or directly mounted on the light-emitting devices 3 in a computer; alternatively, the light guide device 1 can be used in a light-emitting keyboard or mouse or any other peripheral apparatus that is provided with the light-emitting devices 3. Because the light guide device 1 has good light guiding and glare effects when applied to a computer or a computer peripheral apparatus, it can be widely favored by the esports industry manufacturers, thereby improving the overall product competitiveness. The light guide device 1 uses the recessed receiving grooves 130 of the mounting structure 13 to receive the radiation fins 211 of the heat dissipating device 21 and uses the cylindrical positioning columns 131 and the hooks 132 for mounting. In actual application, clamps, pins or other positioning devices can be used to secure the light guide device 1 to the heat dissipating device 21. There are many ways for the light guide device 1 to be combined with the heat dissipating device 21, so that any structure that can achieve the aforementioned effects should be covered by the present invention, and such simple modifications and equivalent structural changes should be included in the present invention.

Further, the light-incident surface 111 of the base 11 of the light guide device 1 is planar. When the at least one light-emitting device 3 emits light onto the light-incident surface 111 of the base 11, the planar light-incident surface 111 minimizes light reflection, enabling incident light to be accurately refracted onto the light guide components 12, reducing light leakage and increasing the light output of light guide device 1, and therefore, the light projection range is relatively increased.

Further, because a contained angle θ within the range of 10°~85° is defined between the base 11 of the light guide device 1 and each light-emitting surface 121 of each light guide component 12, when the at least one light-emitting device 3 emits light onto the light guide device 1, the different angles of the light-emitting surfaces 121 of the light guide components 12 can refract light in different light paths, causing non-uniform outward scattering of light. Therefore, the contained angle θ can be used to reduce the occurrence of backward light refracting, thereby increasing the light extraction rate and refractive index of the light guide component 12.

In conclusion, the invention has the advantages as follows:

(1) The arrangement of the continuously connected and irregularly configured light guide components 12 on at least one side of the base 11 of the light guide device 1 is capable of unevenly projecting light passing therethrough toward the outside, therefore, the light guide components 12 guides the light to the entire light guide device 1 to improve the uniformity of the overall brightness of the light guide device 1, thereby allowing the light guide device 1 to emit a transparent and bright aesthetic sense. Uniform brightness can be used to prevent the viewer from seeing the light-emitting elements 3 directly, avoiding glaring and uncomfortable eyes. Because the light guide device 1 is not added with a light diffusion agent and can work with the light guide components 12 to unevenly output the light emitted by the light-emitting devices 3, it effectively increases the light projection distance and range to produce a glare-like effect that is as beautiful as the aurora. In this way, the light-emitting effect can be more dazzling, so as to enhance the aesthetics of the projected light, thereby increasing the desire of the consumer to purchase.

(2) The light guide device 1 uses the continuously connected and irregularly configured light guide components 12 to improve the overall brightness uniformity and the light projection distance and range without adding any light diffusing agents. Thus, the quantity of light-emitting devices 3 can be minimized, reducing the overall manufacturing cost. Further, the light emitted by the light-emitting devices 3 is refracted by the light guide components 12, avoiding uneven brightness and fogging, so that it can have better brightness uniformity and increased projection distance and projection range.

(3) After installation of the light guide device 1 in the memory 2, the light-emitting devices 3 are located directly below the light-emitting surfaces 121 of the light guide components 12, and are not located at the intersection of the light-emitting surfaces 121. When the light-emitting devices 3 emit light upward, the light-emitting surfaces 121 produce good refracting effects without refracting light onto the intersections of the light-emitting surfaces 121, eliminating the problem of being too bright or too dark and further improving the overall brightness intensity of the light guide device 1 and the brightness uniformity.

(4) The light guide components 12 that are arranged on the light guide device 1 to face the light-emitting devices 3 include two outer light guide components 12 and a plurality of inner light guide components 12 of two different heights alternatively arranged between the two outer light guide components 12, and the two outer light guide components 12 are higher than the relatively shorter inner light guide components 12. This arrangement achieves better continuity of the light source, thereby improving brightness uniformity. Since the two outer light guide components 12 is relatively higher than inner light guide components 12, the light projecting distance is effectively increased.

(5) When the light-emitting devices 3 emit light onto the planar light-incident surface 111 of the base 11, the flat design of the planar light-incident surface 111 minimizes light reflection and effectively refracts incident light onto the light guide components 12, thereby increasing the light output and light projection range of light guide device 1 to create a glare effect.

(6) The light-incident surface 111 of the base 11 is planar. When removing the light guide device 1 from the mold, the planar light-incident surface 111 is flat, so that the mold release point is not generated, thereby reducing the difficulty of manufacturing the light guide device 1. This allows the light guide device 1 to be mass produced through the mold.

(7) The light guide device 1 is preferably made of polycarbonate, acrylonitrile butadiene styrene copolymer, or a combination of the two. It can make the surface of the light guide device 1 less prone to fogging and blurring when it is used for a long time, so as to maintain a good light extraction rate and prolong the service life of the light guide device 1.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A light guide device made of a light diffusing agent-free light transmissive material and adapted for positioning in computers and computer peripheral devices to improve brightness uniformity, comprising a base provided with a light-incident surface at one side thereof to face toward a light-emitting side of a plurality of predetermined light-emitting devices, and a plurality of continuously connected and irregularly configured light guide components located on at least one side of said base and capable of unevenly projecting light passing therethrough toward the outside and respectively provided with at least three light-emitting surfaces, each said light-emitting surface defining with said base a respective contained angle that causes a glare effect when light passes through the respective said light guide component, said contained angle being within the range of 10°~85°;

wherein the direct light emitting direction of said predetermined light-emitting devices is opposite to said light-emitting surfaces of said light guide components; and wherein said light guide components include two outer light guide components and a plurality of inner light guide components of two different heights alternatingly arranged between said two outer light guide components, said two outer light guide components being higher than relatively shorter said inner light guide components.

2. The light guide device as claimed in claim 1, wherein said light guide device is made from polycarbonate.

3. The light guide device as claimed in claim 1, wherein said light guide device is made from acrylonitrile butadiene styrene copolymer.

4. The light guide device as claimed in claim 1, wherein said light guide device is made from a combination of polycarbonate and acrylonitrile butadiene styrene copolymer.

5. The light guide device as claimed in claim 1, wherein at least two said light guide components are formed on said base in a square area of 1 square centimeter.

6. The light guide device as claimed in claim 1, wherein said light-incident surface of said base is planar.

7. The light guide device as claimed in claim 1, wherein said contained angle defined between each said light-emitting surface and said base is within the range of 26°~65°.

8. The light guide device as claimed in claim 1, wherein said light guide components are selectively triangular, tetragonal, pentagonal, hexagonal, heptagonal or octagonal shape.

9. The light guide device as claimed in claim 1, wherein the height of said light guide components is within the range of 0.8 mm~1.2 mm; the pitch of said predetermined light-emitting devices is 15 mm.

10. The light guide device as claimed in claim 1, further comprising a mounting structure located on said base, said mounting structure comprising a plurality of recessed receiving grooves respectively located on opposing left and right sides of said base and facing in opposite directions, a cylindrical positioning column protruded from an inner wall of each said recessed receiving groove, and two hooks respectively located at two opposite ends of said base.

\* \* \* \* \*